US008568857B2

(12) United States Patent
Takashima et al.

(10) Patent No.: US 8,568,857 B2
(45) Date of Patent: Oct. 29, 2013

(54) GRAIN ORIENTED ELECTRICAL STEEL SHEET

(75) Inventors: Minoru Takashima, Tokyo (JP); Hirotaka Inoue, Tokyo (JP); Seiji Okabe, Tokyo (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 13/814,553

(22) PCT Filed: Aug. 5, 2011

(86) PCT No.: PCT/JP2011/004479

§ 371 (c)(1),
(2), (4) Date: Feb. 6, 2013

(87) PCT Pub. No.: WO2012/017695

PCT Pub. Date: Feb. 9, 2012

(65) Prior Publication Data

US 2013/0143004 A1 Jun. 6, 2013

(30) Foreign Application Priority Data

Aug. 6, 2010 (JP) ................................ 2010-177965

(51) Int. Cl.
*B32B 3/30* (2006.01)

(52) U.S. Cl.
USPC ........... 428/167; 428/172; 428/212; 428/219; 428/600; 428/630; 428/632; 148/307

(58) Field of Classification Search
USPC ......... 428/168, 172, 212, 219, 699, 701, 630, 428/632, 167, 600; 148/307
See application file for complete search history.

(56) References Cited

U.S. PATENT DOCUMENTS

| | | | | |
|---|---|---|---|---|
| 6,110,298 | A * | 8/2000 | Senda et al. | 148/308 |
| 2002/0157734 | A1 * | 10/2002 | Senda et al. | 148/111 |

FOREIGN PATENT DOCUMENTS

| | | |
|---|---|---|
| JP | 56-75579 | 6/1981 |
| JP | 5-311453 | 11/1993 |
| JP | 5-339635 | 12/1993 |
| JP | 2001-303261 | 10/2001 |

* cited by examiner

*Primary Examiner* — Donald J Loney
(74) *Attorney, Agent, or Firm* — DLA Piper LLP (US)

(57) ABSTRACT

A grain oriented electrical steel sheet has grooves on one surface of the steel sheet formed for magnetic domain refining, the steel sheet including a forsterite film and a tension coating on front and back surfaces of the steel sheet, wherein the tension coating is applied on a surface with the grooves in a coating amount A (g/m$^2$) and is applied on a surface with no grooves in a coating amount B (g/m$^2$), the coating amounts A and B satisfying (1) and (2):

$$3 \le A \le 8 \quad (1);$$

and $$1.0 < B/A \le 1.8 \quad (2).$$

2 Claims, 1 Drawing Sheet

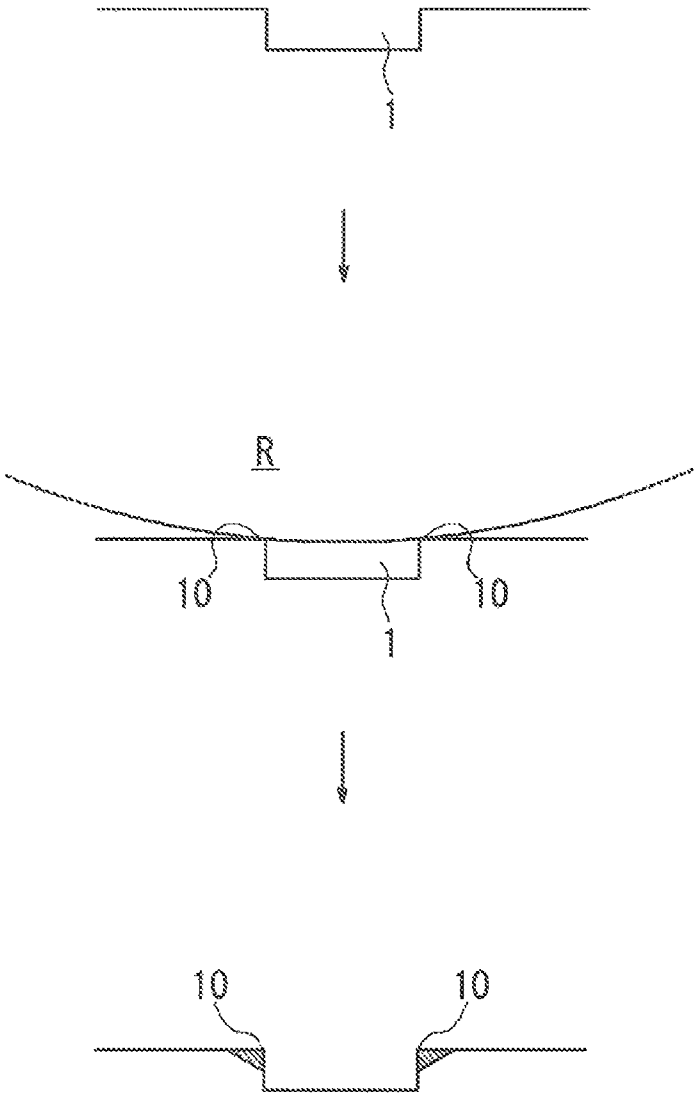
1
R
10
10
1
10
10

GRAIN ORIENTED ELECTRICAL STEEL SHEET

RELATED APPLICATIONS

This is a §371 of International Application No. PCT/JP2011/004479, with an international filing date of Aug. 5, 2011 (WO 2012/017695 A1, published Feb. 9, 2012), which is based on Japanese Patent Application No. 2010-177965, filed Aug. 6, 2010, the subject matter of which is incorporated herein by reference.

TECHNICAL FIELD

This disclosure relates to a grain oriented electrical steel sheet for use as an iron core material of a transformer or the like.

BACKGROUND

A grain oriented electrical steel sheet is mainly utilized as an iron core of a transformer and required to exhibit superior magnetization characteristics, e.g., low iron loss in particular.

In this regard, it is important to highly accumulate secondary recrystallized grains of a steel sheet in (110)[001] orientation, i.e., what is called "Goss orientation," and to reduce impurities in a product steel sheet. However, there are restrictions on controlling crystal grain orientations and reducing impurities in view of production cost. Accordingly, there has been developed a technique of introducing non-uniform strain or grooves into a surface of a steel sheet by physical or chemical means to subdivide the width of magnetic domains to reduce iron loss, i.e., magnetic domain refinement technique.

For example, JP 57-2252 B proposes irradiating a steel sheet as a finished product with a laser to introduce high-dislocation density regions into a surface layer of the steel sheet, thereby narrowing the magnetic domain width and reducing iron loss of the steel sheet.

Further, JP 62-53579 B proposes forming grooves exceeding 5 μm in depth in a base steel of a final-annealed electrical steel sheet, under a load of from 882 MPa to 2,156 MPa (from 90 kgf/mm$^2$ to 220 kgf/mm$^2$), which is then heat treated at a temperature of 750° C. or higher, to thereby refine magnetic domains.

JP 3-69968 B proposes introducing linear notches (grooves) in a direction substantially perpendicular to the rolling direction of the steel sheet at intervals of at least 1 mm in the rolling direction, the notches each being 30 μm or more and 300 μm or less in width and 10 μm or more and 70 μm or less in depth.

The development of the aforementioned magnetic domain refining technologies has made it possible to obtain a grain oriented electrical steel sheet having good iron loss properties.

On the other hand, a grain oriented electrical steel sheet is applied with a tension coating mainly composed of silica and phosphate. The tension coating causes a tensile stress in the grain oriented electrical steel sheet, to thereby effecting improvement in the magnetostrictive property and reduction of transformer noise.

For example, JP 3651213 B, JP 48-39338 A, and JP 50-79442 A each propose a tension coating obtained by applying a treatment solution containing colloidal silica, phosphate, and one or at least two selected from a group consisting of chromic anhydride, chromic acid, and dichromic acid, and baking the solution thus applied.

Further, as an example of a tension coating for a grain oriented electrical steel sheet containing, as main components, colloidal silica and phosphate while being free of chromic anhydride, chromic acid, and dichromic acid, JP 57-9631 B discloses an insulating top coating layer containing colloidal silica, aluminum phosphate, boric acid, and one or at least two selected from a group consisting of sulfates of Mg, Al, Fe, Co, Ni, and Zn. Further, JP 58-44744 B discloses a method of forming an insulation film containing colloidal silica, magnesium phosphate, and one or at least two selected from a group consisting of sulfates of Mg, Al, Mn, and Zn, without containing chromium oxide.

In the meantime, a grain oriented electrical steel sheet obtained as a final product is cut by a shearing machine into electrical steel sheets each having a predetermined length and shape. Then, the electrical steel sheets thus cut are stacked, to thereby serve as an iron core of a transformer. Very high precision is required for the cutting length in the cutting of a steel sheet by the shearing machine. For this reason, it is necessary to dispose a roll called a measuring roll on the front side of the shearing machine to come into contact with a steel sheet and measure the length of the steel sheet through the rotation of the roll, to thereby define the cutting position for the shearing machine.

We discovered that the aforementioned provision of magnetic domain refining treatment through the formation of grooves has the following problem. That is, as illustrated in FIG. 1, when pressed as rolled by a measuring roll R, a groove 1 is likely to develop plastic deformation in edges (corners) 10 where stress is concentrated, thereby causing an increase in transformer noise.

It could therefore be helpful to provide a grain oriented electrical steel sheet having excellent noise property capable of suppressing noise of an actual transformer which is configured by a steel sheet material having grooves formed therein for magnetic domain refining.

SUMMARY

We thus provide a grain oriented electrical steel sheet having grooves on one surface of the steel sheet formed for magnetic domain refining, the steel sheet comprising a forsterite film and a tension coating on the front and back surfaces of the steel sheet, in which the tension coating is applied on a surface with the grooves in a coating amount A (g/m$^2$), and is applied on a surface with no groove in a coating amount B (g/m$^2$), the coating amounts A and B satisfying (1) and (2):

$$3 \le A \le 8 \quad (1);$$

and $$1.0 < B/A \le 1.8 \quad (2).$$

Accordingly, a steel sheet having grooves formed therein for magnetic domain refining treatment can retain its excellent noise property even in the process of being manufactured into an actual transformer, with the result that the excellent noise property can also be manifested in the actual transformer, to thereby achieve low noise in the transformer.

BRIEF DESCRIPTION OF THE DRAWING

Our steel sheets will be further described below with reference to the accompanying drawing, wherein:

FIG. 1 is a schematic view illustrating a steel sheet with a groove suffering plastic deformation due to pressure applied by a measuring roll.

REFERENCE SIGNS LIST

1 groove
10 corner (edge)
R measuring roll

DETAILED DESCRIPTION

We prevent deterioration in noise property of a steel sheet having grooves formed therein for magnetic domain refining when configured as an actual transformer to ensure that the same noise property in the actual transformer, and our steel sheets have a feature in that a relation is defined between an amount of the tension coating on the steel sheet surface with grooves and an amount of the tension coating on the steel sheet surface with no grooves. The aforementioned relation is defined such that the coating thickness of the tension coating on a steel sheet surface with no grooves becomes larger than the coating thickness of the tension coating on a steel sheet surface with grooves, to thereby suppress an increase in transformer noise resulting from plastic deformation caused by pressure applied by a measuring roll.

Meanwhile, in the grain oriented electrical steel sheet having grooves formed on a steel sheet surface, as illustrated in FIG. 1, the groove 1 is likely to develop plastic deformation at the edges (corners) 10 (hatched portion of FIG. 1) due to stress concentrated thereon when pressed and rolled by a measuring roll R, and the plastic deformation thus developed has been a cause of increasing transformer noise. To suppress an increase in transformer noise resulting from the development of plastic deformation, it is effective to increase the coating thickness of the tension coating so that the tensile stress to be generated by the tension coating is increased in the base steel.

It may be effective to further increase the coating thickness of the tension coating to increase the tensile stress for the purpose of preventing the noise property from being affected by plastic deformation resulting from the measuring roll R. However, a mere increase in the coating thickness leads to embrittlement of the coating. As a result, when the corners of a groove, where stress is concentrated, come into contact with the measuring roll, the tension coating easily peels off and turn into powder. If the powder thus generated should be caught in the measuring roll, the powder is pressed against the steel sheet surface, which also leads to generation of plastic deformation, with the result that the transformer noise is rather increased adversely.

To avoid the aforementioned problem, JP '213 above proposes a method of applying the coating in twice, to thereby alleviate the brittleness of the coating. The method, however, involves a problem of increase in manufacturing cost.

In view of this, we apply a coating amount A per unit area (g/m$^2$) of the tension coating onto a steel sheet surface with grooves and satisfies (1):

$$3 \le A \le 8 \qquad (1).$$

To be more specific, the tension coating applied in the coating amount A of less than 3 g/m$^2$ fails to impart sufficient tension, leading to a deterioration in noise property. On the other hand, the tension coating is embrittled when applied in the coating amount A over 8 g/m$^2$, with the result that the coating peels off at the corners of each groove under pressure applied by the measuring roll and turns into powder, and the powder is then pressed against the steel sheet by the measuring roll, to thereby deteriorate the noise property after all.

Further, the ratio of coating amount B per unit area (g/m$^2$) of the tension coating applied onto a steel sheet surface with no grooves to the aforementioned coating amount A (g/m$^2$), namely, the ratio B/A essentially needs to fall within (2):

$$1.0 < B/A \le 1.8 \qquad (2).$$

The surface with no grooves has no steel surface irregularities and thus the tension coating can be prevented from turning into powder even if the applied amount of tension coating applied is increased. Therefore, there occurs no adverse effect of generating noise unlike in the aforementioned case where powder is forced into the steel sheet surface. On the other hand, although the surface with grooves is still subjected to plastic deformation in the corners (edges) of each groove under pressure applied by the measuring roll, the tension coating on the other surface with no grooves can be increased in coating thickness so that the noise resulting from the aforementioned plastic deformation can be suppressed without any adverse effect of the aforementioned powder.

Specifically, the ratio B/A can be defined to exceed 1.0 to improve noise property. A conceivable reason therefor is that, as compared to a case where B/A is 1.0 which means that the coating applied onto both of the surfaces in the same amount, the B/A defined as described above is capable of increasing tensile stress imparted to the base steel making the steel sheet less susceptible to noise resulting from plastic deformation caused by the measuring roll. Such an effect is effectively produced without being compensated by an increase in noise resulting from generation of powder. However, the B/A over 1.8 rather deteriorates the noise property. This may be ascribable to the fact that too much difference is generated in tension imparted by the tension coating between the front and back surfaces, forcing the steel sheet into a convex shape.

Next, manufacturing conditions of the grain oriented electrical steel sheet are specifically described.

The chemical composition of a slab for the grain oriented electrical steel sheet may be any chemical composition as long as the composition can cause secondary recrystallization. Crystal grains in the product steel sheet having a smaller shift angle of in <100> orientation with respect to the rolling direction produce a larger effect of reducing iron loss through the magnetic domain refinement and, therefore, the shift angle thereof is preferably 5° or smaller at an average.

Further, in a case of using an inhibitor, for example, in a case of using AlN inhibitor, an appropriate amount of Al and N may be contained while in a case of using MnS and/or MnSe inhibitor, an appropriate amount of Mn and Se and/or S may be contained. Both of the inhibitors may also be used in combination. Preferred contents of Al, N, S, and Se in this case are as follows:

Al: 0.01 mass % to 0.065 mass %;
N: 0.005 mass % to 0.012 mass %;
S: 0.005 mass % to 0.03 mass %; and
Se: 0.005 mass % to 0.03 mass %.

Further, our methods can also be applied to a grain oriented electrical steel sheet in which the contents of Al, N, S, and Se are limited and no inhibitor is used.

In this case, the amounts of A, N, S, and Se each may preferably be suppressed as follows:

Al: 100 mass ppm or below;
N: 50 mass ppm or below;
S: 50 mass ppm or below; and
Se: 50 mass ppm or below.

Specific examples of basic components and other components to be optionally added to a steel slab for use in manufacturing the grain oriented electrical steel sheet are as follows.

C: 0.15 mass % or less

Carbon is added to improve texture of a hot rolled steel sheet. Carbon content in steel is preferably 0.15 mass % or less because carbon content exceeding 0.15 mass % increases the burden of reducing carbon content during the manufacturing process to 50 mass ppm or less at which magnetic aging is reliably prevented. The lower limit of carbon content in steel need not be particularly set because secondary recrystallization is possible in a material not containing carbon.

Si: 2.0 mass % to 8.0 mass %

Silicon is an element which effectively increases electrical resistance of steel to improve iron loss properties thereof. Silicon content in steel equal to or higher than 2.0 mass % ensures a particularly good effect of reducing iron loss. On the other hand, Si content in the steel equal to or lower than 8.0 mass % ensures particularly good formability and magnetic flux density of a resulting steel sheet. Accordingly, Si content in steel is preferably 2.0 mass % to 8.0 mass %.

Mn: 0.005 mass % to 1.0 mass %

Manganese is an element which advantageously achieves good hot-workability of a steel sheet. Manganese content in a steel sheet less than 0.005 mass % cannot cause the good effect of Mn addition sufficiently. Manganese content in a steel sheet equal to or lower than 1.0 mass % ensures particularly good magnetic flux density of a product steel sheet. Accordingly, Mn content in a steel sheet is preferably 0.005 mass % to 1.0 mass %.

Further, the slab for the grain oriented electrical steel sheet may contain, for example, the following elements as magnetic properties improving components in addition to the basic components described above.

At least one element selected from Ni: 0.03 mass % to 1.50 mass %, Sn: 0.01 mass % to 1.50 mass %, Sb: 0.005 mass % to 1.50 mass %, Cu: 0.03 mass % to 3.0 mass %, P: 0.03 mass % to 0.50 mass %, Mo: 0.005 mass % to 0.10 mass %, and Cr: 0.03 mass % to 1.50 mass %

Nickel is a useful element in terms of further improving texture of a hot rolled steel sheet and thus magnetic properties of a resulting steel sheet. However, Nickel content in steel less than 0.03 mass % cannot cause this magnetic properties-improving effect by Ni sufficiently, while Nickel content in steel equal to or lower than 1.5 mass % ensures stability in secondary recrystallization to improve magnetic properties of a resulting steel sheet. Accordingly, Ni content in steel is preferably 0.03 mass % to 1.5 mass %.

Sn, Sb, Cu, P, Mo, and Cr each are a useful element in terms of improving magnetic properties of the grain oriented electrical steel sheet. However, sufficient improvement in magnetic properties cannot be obtained when contents of these elements are less than the respective lower limits specified above. On the other hand, contents of these elements equal to or lower than the respective upper limits described above ensure the optimum growth of secondary recrystallized grains. Accordingly, it is preferred that the slab for the grain oriented electrical steel sheet contains at least one of Sn, Sb, Cu, P, Mo, and Cr within the respective ranges thereof specified above.

The balance other than the aforementioned components of the slab for the grain oriented electrical steel sheet is Fe and incidental impurities incidentally mixed thereinto during the manufacturing process.

Next, a slab having the aforementioned chemical compositions is heated and then subjected to hot rolling, according to a conventional method. Alternatively, the casted slab may be immediately hot rolled without being heated. In a case of a thin cast slab/strip, the slab/strip may be either hot rolled or directly fed to the next process skipping hot rolling.

A hot rolled steel sheet (or the thin cast slab/strip which skipped hot rolling) is then subjected to hot-band annealing according to necessity. The main purpose of the hot-band annealing is to eliminate the band texture resulting from the hot rolling to have the primary recrystallized texture formed of uniformly-sized grains so that the Goss texture is allowed to further develop in the secondary recrystallization annealing, to thereby improve the magnetic property. At this time, to allow the Goss texture to highly develop in the product steel sheet, the hot-band annealing temperature is preferably 800° C. to 1,200° C. At a hot-band annealing temperature lower than 800° C., the band texture resulting from the hot rolling is retained, which makes it difficult to have the primary recrystallization texture formed of uniformly-sized grain, and thus a desired improvement in secondary recrystallization cannot be obtained. On the other hand, at a hot-band annealing temperature higher than 1,200° C., the grain size is excessively coarsened after the hot-band annealing, which makes it extremely difficult to obtain a primary recrystallized texture formed of uniformly-sized grain.

After hot-band annealing, the sheet is subjected to cold rolling once or at least twice, with intermediate annealing therebetween before being subjected to decarburizing annealing (which also serves as recrystallization annealing), which is then applied with an annealing separator. The steel sheet may also be subjected to nitridation or the like for the purpose of strengthening the inhibitors, either during the primary recrystallization annealing, or after the primary recrystallization annealing and before the initiation of the secondary recrystallization. The steel sheet applied with an annealing separator before the secondary recrystallization annealing is then subjected to final annealing for the purpose of secondary recrystallization and forming a forsterite film (film mainly composed of $Mg_2SiO_4$).

To form forsterite, an annealing separator mainly composed of MgO may preferably be used. A separator mainly composed of MgO may also contain, in addition to MgO, a known annealing separator component or a property improvement component, without inhibiting the formation of a forsterite film.

It should be noted, as described in below, that the grooves may be formed in any stage, as long as after the final cold rolling. That is, the grooves may suitably be formed before or after the primary recrystallization annealing, before or after the secondary recrystallization annealing, or before or after flattening annealing. However, once the tension coating is applied, another process is required in which the coating film formed on groove-forming positions is removed before forming grooves by a technique to be described later, and then the coating is formed again. Therefore, it is preferred to form grooves after the final cold rolling, but before application of the tension coating.

After final annealing, it is effective to level the shape of the steel sheet through flattening annealing. Meanwhile, the steel sheet surface is applied with a tension coating before or after the flattening annealing. The tension coating treatment solution may be applied before the flattening annealing so that the coating can be baked during the flattening annealing. It is essential to adjust the coating amount of the tension coating to be applied to a steel sheet, depending on whether the coating is formed on a surface with grooves or on a surface with no groove.

The tension coating refers to a coating capable of tension to a steel sheet for the purpose of reducing iron loss. Any coating mainly composed of silica or phosphate may advantageously be adopted as the tension coating.

Specifically, a coating treatment solution is prepared by containing, as main components, colloidal silica to 5 mass % to 30 mass %, and a primary phosphate of Mg, Ca, Ba, Sr, Zn, Al, and Mn to 5 mass % to 30 mass %, which is added with, as necessary, known additives such as chromic anhydride, sulfates of Mg, Al, Mn, and Zn, and hydroxides of Fe and Ni, which is applied to a steel sheet and baked at a temperature of 350° C. or higher and 1,000° C. or lower, preferably, of 700° C. or higher and 900° C. or lower, to thereby obtain a preferred tension coating.

Further, grooves are formed on a surface of a grain oriented electrical steel sheet in any stage after final cold rolling, specifically, before or after the primary recrystallization annealing, before or after the secondary recrystallization annealing, or before or after flattening annealing.

The grooves may be formed by any conventionally-known method of forming grooves. Examples thereof may include: a local etching method; a method of scrubbing with a knife or the like; and a method of rolling with a roll having protrusions. The most preferred method is to apply, by printing or the like, an etching resist onto a final cold rolled steel sheet, which is subjected to electrolytic etching so that grooves are formed in regions having no etching resist applied thereon.

The grooves to be formed on a steel sheet surface each may preferably be defined to have, in the case of linear grooves, a width of 50 μm to 300 μm and a depth of 10 μm to 50 μm, and may preferably be arranged at intervals of about 1.5 mm to 20.0 mm. The deviation of each linear groove relative to a direction perpendicular to the rolling direction may preferably be 30° above or below. The term “linear” refers not only to a line rendered as a solid line, but also to a line rendered as a dotted line or a broken line.

Any other processes and manufacturing conditions that are not specifically described above may adopt those for a conventionally-known method of manufacturing a grain oriented electrical steel sheet in which magnetic domain refining treatment is performed through the formation of grooves.

EXAMPLES

Example 1

A steel slab having a component composition including by mass %: C: 0.060%; Si: 3.35%; Mn: 0.07%; Se: 0.016%; S: 0.002%; sol. Al: 0.025%; N: 0.0090%; and the balance being Fe and incidental impurities was manufactured through continuous casting, which was then heated to 1,400° C. and hot rolled to obtain a hot rolled steel sheet of 2.2 mm in sheet thickness. The hot rolled steel sheet was then subjected to hot-band annealing at 1,000° C., which was followed by cold rolling to obtain a steel sheet of 1.0 mm in intermediate thickness. The cold rolled steel sheet thus obtained was subjected to intermediate annealing at 1,000° C., and then cold rolled to be formed into a cold rolled steel sheet of 0.23 mm in sheet thickness.

Thereafter, the steel sheet was applied with an etching resist by gravure offset printing, and subjected to electrolytic etching and resist stripping in an alkaline fluid, to thereby form linear grooves each being 150 μm in width and 20 μm in depth, at an inclination angle of 10° relative to a direction perpendicular to the rolling direction, at intervals of 3 mm in the rolling direction.

Next, the steel sheet was subjected to decarburizing annealing at 825° C. and then applied with an annealing separator mainly composed of MgO, which was subjected to final annealing at 1,200° C. for 10 hours for the purpose of secondary recrystallization and purification.

Then, the steel sheet was applied with a tension coating treatment solution containing colloidal silica by 20 mass % and primary magnesium phosphate by 10 mass %, and subjected to flattening annealing at 830° C. during which the tension coating was also baked simultaneously, to thereby provide a product steel sheet. The product steel sheet thus obtained was evaluated for magnetic property and film tension. At that time, the tension coating amount A (g/m$^2$) on a surface with grooves and the tension coating amount B (g/m$^2$) on a surface with no groove were varied as shown in Table 1. The coating amount A (g/m$^2$) and the coating amount B (g/m$^2$) were measured based on the difference in weight before and after the coating removal. Specifically, the steel sheet was sheared into 10 sheets each being in a size of 100 mm×100 mm, and the non-measuring surface thereof was covered by tape, which was then immersed into a high-temperature and high concentration aqueous solution of NaOH to remove the coating on the measuring surface, so as to obtain a difference in weight of the steel sheet before and after the coating removal, which was converted in a coating amount per 1 m$^2$ of the surface. The measurement results are shown in Table 1.

Next, each product was sheared into specimens having bevel edges as having the steel sheet length measured by a measuring roll of 50 mm in diameter and 50 mm in width (with a pressing force of 350 N). The electrical steel sheets (specimens) thus obtained were stacked to prepare an oil-filled three-phase transformer of 1000 kVA. The transformer thus prepared was excited to 1.7 T, 50 Hz, and measured for noise.

The aforementioned noise measuring results are also shown in Table 1.

TABLE 1

| | A (g/m$^2$) | B (g/m$^2$) | B/A | Noise (dB) | Powdering | Remarks |
|---|---|---|---|---|---|---|
| 1 | 4.0 | 3.2 | 0.8 | 65 | unidentified | Comparative Example |
| 2 | 4.0 | 4.0 | 1.0 | 62 | unidentified | Comparative Example |
| 3 | 4.0 | 4.4 | 1.1 | 60 | unidentified | Example |
| 4 | 4.0 | 4.8 | 1.2 | 58 | unidentified | Example |
| 5 | 4.0 | 5.6 | 1.4 | 57 | unidentified | Example |
| 6 | 4.0 | 6.4 | 1.6 | 58 | unidentified | Example |
| 7 | 4.0 | 7.2 | 1.8 | 60 | unidentified | Example |
| 8 | 4.0 | 8.0 | 2.0 | 62 | unidentified | Comparative Example |

As shown in Table 1, a transformer formed by using a grain oriented electrical steel sheet which has been subjected to magnetic domain refining treatment through the formation of grooves and satisfies the range defined by the present invention exhibits extremely excellent noise property even if the steel sheet has been pressed by the measuring roll. However, grain oriented electrical steel sheets falling out of our range failed to attain noise reduction.

Example 2

A steel slab having a component composition including by mass %: C: 0.060%; Si: 3.35%; Mn: 0.07%; Se: 0.016%; S: 0.002%; sol. Al: 0.025%; N: 0.0090%; and the balance being Fe and incidental impurities was manufactured through continuous casting, which was then heated to 1,400° C. and hot rolled to obtain a hot rolled steel sheet of 2.2 mm in sheet thickness. The hot rolled steel sheet was then subjected to hot-band annealing at 1,000° C., which was followed by cold rolling to obtain a steel sheet of 1.0 mm in intermediate thickness. The cold rolled steel sheet thus obtained was subjected to intermediate annealing at 1,000° C., and then cold rolled to be formed into a cold rolled steel sheet of 0.23 mm in sheet thickness.

Next, the steel sheet was subjected to decarburizing annealing at 825° C. and then applied with an annealing separator mainly composed of MgO, which was subjected to final annealing at 1,200° C. for 10 hours for the purpose of secondary recrystallization and purification. Then, the steel sheet was applied with a tension coating treatment solution containing colloidal silica by 5 mass % and primary magnesium phosphate by 25 mass %, and subjected to flattening annealing at 830° C. to shape the steel sheet. Thereafter, a tension coating containing colloidal silica and magnesium phosphate, by 50% each, was applied.

One of the surfaces of the steel sheet was irradiated with a laser to linearly remove the film in a direction perpendicular to the rolling direction, which was then subjected to electrolytic etching, to thereby form linear grooves each being 150 μm in width and 20 μm in depth, at an inclination angle of 10° relative to a direction perpendicular to the rolling direction, at intervals of 3 mm in the rolling direction. Thereafter, a tension coating containing colloidal silica and magnesium phosphate, by 50% each, was again applied, to thereby provide a steel sheet product. At that time, the tension coating amount A ($g/m^2$) on a surface with grooves and the tension coating amount B ($g/m^2$) on a surface with no groove were varied as shown in Table 2. The coating amount of each steel sheet was the total amount of the first coating and the second coating, which was measured in the same way as in Example 1.

Next, each product was sheared into specimens having bevel edges as having the steel sheet length measured by a measuring roll of 60 mm in diameter and 100 mm in width (with a pressing force of 500 N). The electrical steel sheets (specimens) thus obtained were stacked to prepare an oil-filled three-phase transformer of 660 kVA. The transformer thus prepared was excited to 1.7 T, 50 Hz, and measured for noise.

The aforementioned noise measuring results are also shown in Table 2.

TABLE 2

| | A ($g/m^2$) | B ($g/m^2$) | B/A | Noise (dB) | Powdering | Remarks |
|---|---|---|---|---|---|---|
| 1 | 2.0 | 2.8 | 1.4 | 61 | unidentified | Comparative Example |
| 2 | 2.5 | 3.5 | 1.4 | 58 | unidentified | Comparative Example |
| 3 | 3.0 | 4.2 | 1.4 | 57 | unidentified | Example |
| 4 | 5.0 | 7.0 | 1.4 | 57 | unidentified | Example |
| 5 | 7.0 | 9.8 | 1.4 | 57 | unidentified | Example |
| 6 | 8.0 | 11.2 | 1.4 | 57 | unidentified | Example |
| 7 | 8.5 | 11.9 | 1.4 | 59 | identified | Comparative Example |
| 8 | 9.0 | 12.6 | 1.4 | 62 | identified | Comparative Example |

As shown in Table 2, a transformer formed by using a grain oriented electrical steel sheet which has been subjected to magnetic domain refining treatment through the formation of grooves and satisfies our range exhibits extremely excellent noise property even if the steel sheet has been pressed by the measuring roll. However, grain oriented electrical steel sheets falling out of our range failed to attain noise reduction, and further, powdering was identified in some of the sheets.

Example 3

A steel slab having a component composition including by mass %: C: 0.070%; Si: 3.20%; Mn: 0.07%; S: 0.02%; sol. Al: 0.025%; N: 0.0090%; and the balance being Fe and incidental impurities was manufactured through continuous casting, which was then heated to 1,400° C. and hot rolled to obtain a hot rolled steel sheet of 2.2 mm in sheet thickness. The hot rolled steel sheet was then subjected to hot-band annealing at 1,000° C., which was followed by cold rolling to obtain a steel sheet of 2.0 mm in intermediate thickness. The cold rolled steel sheet thus obtained was subjected to intermediate annealing at 1,000° C., and then cold rolled to be formed into a cold rolled steel sheet of 0.29 mm in sheet thickness.

Thereafter, the steel sheet was applied with an etching resist by gravure offset printing, and subjected to electrolytic etching and resist stripping in an alkaline fluid, to thereby form linear grooves each being 150 μm in width and 20 μm in depth, at an inclination angle of 10° relative to a direction perpendicular to the rolling direction, at intervals of 3 mm in the rolling direction.

Next, the steel sheet was subjected to decarburizing annealing at 825° C. and then applied with an annealing separator mainly composed of MgO, which was subjected to final annealing at 1,200° C. for 10 hours for the purpose of secondary recrystallization and purification.

Then, each steel sheet was applied with each of various tension coating treatment solutions shown in Table 3, and subjected to flattening annealing at 830° C. during which the tension coating was also baked simultaneously, to thereby provide a product steel sheet. The product steel sheet thus obtained was evaluated for magnetic property and film tension. At that time, the tension coating amount A ($g/m^2$) on a surface with grooves and the tension coating amount B ($g/m^2$) on a surface with no groove were varied as shown in Table 3. The amount A ($g/m^2$) and the amount B ($g/m^2$) were measured based on the difference in weight before and after the coating removal. Specifically, the steel sheet was sheared into 10 sheets each being in a size of 100 mm×100 mm, and the non-measuring surface thereof was covered by tape, which was then immersed into a high-temperature and high density aqueous solution of NaOH to remove the coating on the measuring surface, so as to obtain a difference in weight of the steel sheet before and after the coating removal, which was converted in a coating amount per 1 $m^2$ of the surface. The measurement results are shown in Table 3.

Next, each product was sheared into specimens having bevel edges as having the steel sheet length measured by a measuring roll of 50 mm in diameter and 50 mm in width (with a pressing force of 350 N). The electrical steel sheets (specimens) thus obtained were stacked to prepare an oil-filled three-phase transformer of 1000 kVA. The transformer thus prepared was excited to 1.7 T, 50 Hz, and measured for noise.

The aforementioned noise measuring results are also shown in Table 3.

TABLE 3

| | Tension coating treatment solution | A (g/m$^2$) | B (g/m$^2$) | B/A | Noise (dB) | Powdering | Remarks |
|---|---|---|---|---|---|---|---|
| 1 | colloidal silica: 10 mass % + primary aluminum phosphate: 20 mass % | 3.0 | 4.0 | 1.3 | 57 | unidentified | Example |
| 2 | colloidal silica: 10 mass % + primary aluminum phosphate: 20 mass % | 3.0 | 6.0 | 2.0 | 65 | unidentified | Comparative Example |
| 3 | colloidal silica: 10 mass % + primary aluminum phosphate: 20 mass % + chromic anhydrid: 2 mass % | 5.0 | 7.0 | 1.4 | 57 | unidentified | Example |
| 4 | colloidal silica: 10 mass % + primary aluminum phosphate: 20 mass % + chromic anhydrid: 2 mass % | 5.0 | 4.0 | 0.8 | 66 | unidentified | Comparative Example |
| 5 | colloidal silica: 10 mass % + primary magnesium phosphate: 25 mass % + chromic anhydrid: 4 mass % | 7.0 | 9.0 | 1.3 | 57 | unidentified | Example |
| 6 | colloidal silica: 10 mass % + primary magnesium phosphate: 25 mass % + chromic anhydrid: 4 mass % | 9.0 | 12.0 | 1.3 | 68 | identified | Comparative Example |
| 7 | colloidal silica: 15 mass % + primary calcium phosphate: 10 mass % + primary magnesium phosphate: 10 mass % | 4.0 | 6.0 | 1.5 | 57 | unidentified | Example |
| 8 | colloidal silica: 15 mass % + primary calcium phosphate: 10 mass % + primary barium phosphate: 10 mass % + iron oxide hydroxide: 5 mass % | 4.0 | 6.0 | 1.5 | 57 | unidentified | Example |

As shown in Table 3, a transformer formed by using a grain oriented electrical steel sheet which has been subjected to magnetic domain refining treatment through the formation of grooves and satisfies our range exhibits extremely excellent noise property even if the steel sheet has been pressed by the measuring roll. However, grain oriented electrical steel sheets falling out of our range failed to attain noise reduction, and further, powdering was identified in some of the sheets.

The invention claimed is:

1. A grain oriented electrical steel sheet having grooves on one surface of the steel sheet formed for magnetic domain refining, the steel sheet comprising a forsterite film and a tension coating containing silica and phosphate on front and back surfaces of the steel sheet, wherein either one of the front and the back surfaces is provided with the grooves and another of the front and back surfaces is not provided with the grooves; and wherein the tension coating is applied on a surface with the grooves in a coating amount A (g/m$^2$), and is applied on the other surface with no grooves in a coating amount B (g/m$^2$), the coating amounts A and B satisfying (1) and (2):

$$3 \leq A \leq 8 \quad (1);$$

and $$1.0 < B/A \leq 1.8 \quad (2).$$

2. A grain oriented electrical steel sheet of claim 1, wherein the coating amounts A and B satisfying (3):

$$1.1 \leq B/A \leq 1.8 \quad (3).$$

* * * * *